W. H. GEIGER.
GEARING FOR EGG BEATERS, CREAM WHIPPERS, AND THE LIKE.
APPLICATION FILED APR. 18, 1918.
1,327,950.
Patented Jan. 13, 1920.
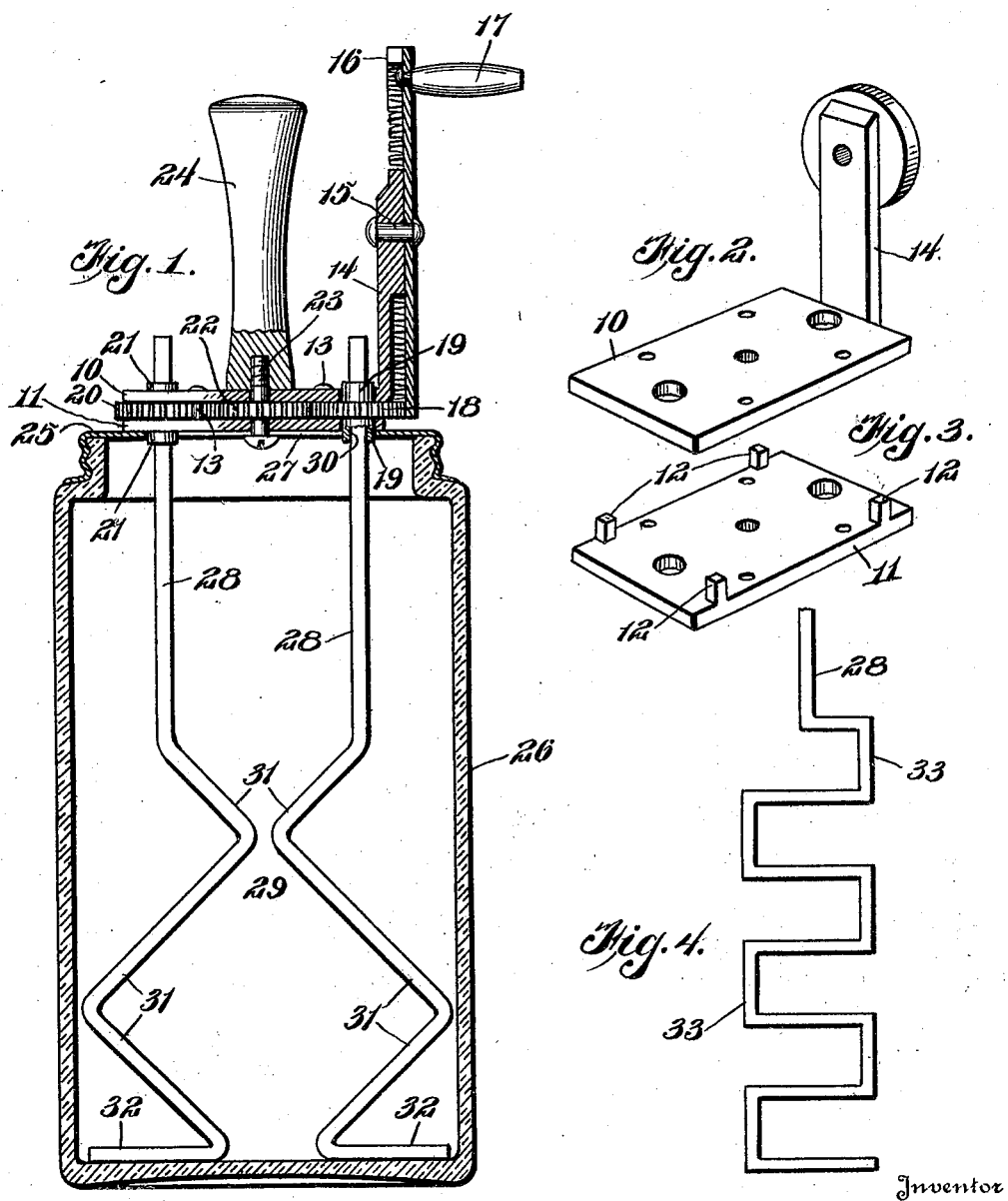
Inventor
W. H. Geiger
By A. A. Hines,
Attorney

UNITED STATES PATENT OFFICE.

WILLIAM H. GEIGER, OF OAKLAND, CALIFORNIA.

GEARING FOR EGG-BEATERS, CREAM-WHIPPERS, AND THE LIKE.

1,327,950. Specification of Letters Patent. Patented Jan. 13, 1920.

Application filed April 18, 1918. Serial No. 229,292.

*To all whom it may concern:*

Be it known that I, WILLIAM H. GEIGER, a citizen of the United States, residing at Oakland, in the county of Alameda and State of California, have invented new and useful Improvements in Gearing for Egg-Beaters, Cream-Whippers, and the like, of which the following is a specification.

The invention relates to drive gearing for egg beaters, cream whippers and the like, the object being to provide a drive gearing of simple and relatively inexpensive construction and adapted for use in connection with a receptacle or vessel of any desired shape or size but more especially for jars having removable screw caps or the like to which the apparatus may be applied to facilitate the mounting thereof upon the vessel.

Further objects and advantages will appear in the course of the following description, it being understood that changes in form, proportion and details may be resorted to within the scope of the appended claims without departing from the spirit of the invention.

In the drawing,

Figure 1 is a side view of the device applied in the operative position to a glass jar and showing an effective form of beater or whipper blade, a portion of the mechanism being shown in section.

Figs. 2 and 3 are detail views respectively of the upper and lower plates constituting the base of the apparatus.

Fig. 4 is a detail view of a slightly modified form of beater.

In the illustrated embodiment of the invention there is employed a base consisting of upper and lower parallel plates 10 and 11, one of which, preferably the lower plate is provided with spacing studs 12, and connecting the same are rivets 13 or equivalent fastening devices for maintaining the members of the base in the desired relative positions. The upper plate of the base is provided with an upright 14 upon which by means of a suitable spindle 15 is mounted a drive gear 16 of the crown tooth type and having a handle 17 by which the desired rotary motion thereof may be communicated, said gear meshing with a pinion 18 which is mounted between the plates of the base and is provided with bearing bosses 19. A similar gear 20 is correspondingly mounted on the base, the same having bearing bosses 21, and motion is communicated from the gear 18 to the gear 20 by means of an intermediate gear 22 journaled on a spindle member 23 which is shown as of screw form and is extended upwardly above the upper plate of the base to engage a grip 24 by which the mechanism may be steadied, particularly when used in connection with a bowl or other relatively large receptacle to which it may not be anchored. Preferably the base of the apparatus is rested upon the screw cap or similar cover 25 of a receptacle such as a jar 26 similar to those used for containing preserves and the like, said cap or cover being provided with a slot 27 through which the lower bosses of the pinions 18 and 20 extend and also through which extends the spindle of the intermediate or transmission gear 22. The head of this spindle is preferably large enough to bear upon the under surface of the cap or cover on each side of the slot therein so as to form a more or less permanent adjustment to the cap or cover, but the contact of the bosses of the gears 18 and 20 with the round ends of the slot 27 in the cap or cover is sufficient to steady the device on the latter especially when the grip 24 is grasped by the hand of the operator.

Connected adjustably with the gears 18 and 20 are the shanks 28 of the beaters 29, said shanks preferably being of irregular cross sectional contour, as for example, square or triangular and fitting in corresponding seats or bores 30 in said gears to provide for the communication of rotary motion from the gears to the beaters while permitting an axial or vertical adjustment of the beaters to suit the depth of the vessel in connection with which the apparatus may be used. This axial yielding characteristic of the beaters is also of advantage in enabling the latter to pass over any obstructions which may be present at the bottom of the jar or vessel in which the beater may be employed.

Preferably the blank from which the beaters with their connected shanks or stems are formed consists of lengths of wire or rod of any suitable gage and the lower or beater portions thereof are preferably twisted to increase the cutting and agitating action on the material under treatment, and this twisted portion of the beater, and constituting the blade thereof may be bent into any desired form to insure action upon the contents of the vessel under the most favorable conditions as shown respectively in Figs. 1 and 4. In Fig. 1 said beater blades are shown as consisting of diagonally disposed flies 31 terminating in a horizontal member 32 whereas in Fig. 4 the bends are made at right angles to produce substantially rectangular wings 33.

From the foregoing description it will be obvious that whether the apparatus is attached to a jar top or cover or is used independently of a receptacle cover, as in a bowl or pan, it may be steadied or supported in the desired position by grasping the handle or grip 24 while the drive gear is operated by the other hand to produce rotation of the beater blades at the desired velocity to accomplish the object in view, and as above noted any variation in the position of the operating mechanism with reference to the plane of the bottom of the vessel, or any variation in the depth of the vessel, within reasonable limits, will be compensated for by the yielding connection between the beater stems or shanks and the gears or pinions in which said stems are mounted. Also it will be evident that those elements of the device which come in contact with the material to be treated are readily detachable from the driving mechanism to permit of thorough cleansing.

Having thus fully described my invention, I claim:

1. In gearing of the class described a base consisting of parallel spaced plates, gears mounted between the plates and having bearing bosses arranged in bearings thereof and provided with bores of angular cross section, an intermediate transmission gear having its spindle engaged with the plates and projected above the upper plate to form a threaded extension, a grip handle directly connected with the threaded extension of said spindle, rotary elements having shanks or stems of angular cross section fitted in the bores of the bearing bosses of said gears, and means for communicating rotary motion to the train of gears.

2. In gearing of the class described a base consisting of parallel spaced plates one of which is extended to form a standard, a train of gears mounted between the plates and arranged in mesh whereby motion may be communicated from one to the other, certain of said gears being provided with bores of angular cross section, and rotary elements having shanks or stems of angular cross section removably fitted in said bores and adapted to receive rotary motion from said gears.

3. In gearing of the class described, the combination with a casing or receptacle provided with a cap or cover having a diametrical slot, of a base consisting of parallel spaced plates, gears mounted between the plates and provided with bearing bosses mounted therein and extending into the slot of said cap or cover, certain of said gears having bores of angular cross section, rotary elements having shanks or stems of angular cross section removably fitted in said bores of said certain gears, and means for communicating rotary motion to said gears.

4. In gearing of the class described, a pair of plates having openings therein adapted to register with each other, upstanding spacing members on one of said plates adapted to engage and support the other plate, screws for fastening said plates together, the said plates having alined central apertures, a screw extending through said apertures, an intermediate gear rotatably mounted upon said screw, a handle member engaged with one end of said screw, bosses arranged in the registering openings in said plates, gears secured to said bosses, the said gears being in mesh with the said intermediate gear, means for rotating one of the gears, and elements extending through said bosses to be rotated by the latter.

In testimony whereof I affix my signature.

WILLIAM H. GEIGER.